United States Patent [19]

Allen

[11] Patent Number: 4,549,360
[45] Date of Patent: Oct. 29, 1985

[54] DEVICE FOR ALIGNMENT OF PROCESS EQUIPMENT AND METHOD OF USE THEREOF

[75] Inventor: Frank L. Allen, Montclair, N.J.

[73] Assignee: Algate Instrument Corp., Montclair, N.J.

[21] Appl. No.: 632,228

[22] Filed: Jul. 19, 1984

[51] Int. Cl.⁴ ............................................. G01C 15/00
[52] U.S. Cl. ........................................ 33/293; 33/286
[58] Field of Search ................... 33/181 R, 182, 286, 33/293, 299

[56] References Cited

U.S. PATENT DOCUMENTS

| | | | |
|---|---|---|---|
| 2,467,733 | 4/1949 | Ehrenberg | 33/293 |
| 4,141,310 | 2/1979 | Rich, Jr. | 33/293 |
| 4,428,122 | 1/1984 | Mann | 33/293 |

FOREIGN PATENT DOCUMENTS

| | | | |
|---|---|---|---|
| 92223 | 6/1897 | Fed. Rep. of Germany | 33/293 |
| 32394 | 10/1964 | Fed. Rep. of Germany | 33/293 |
| 13311 | 1/1982 | Japan | 33/293 |
| 248259 | 12/1969 | U.S.S.R. | 33/293 |

*Primary Examiner*—Richard R. Stearns
*Attorney, Agent, or Firm*—Siegmar Silber

[57] ABSTRACT

An alignment-target mount for permanent installation along an optical line-of-sight is disclosed. The mount includes a cylindrical body of a nonferrous material, which body, in turn, includes a hollow casing with a longitudinal axis substantially positionable within the vertical plane of the line-of-sight; a plug attachable to the inner casing wall having a rotatably positionable slideway thereacross; an alignment-target base slidably supported by the slideway of the plug and adjustable along a line predetermined by the rotational position of the plug; and a locking device for affixing the target base to the plug. With the basic unit, there is included a demountable target assembly affixable to the alignment-target base. The geometry of the target base is such that the alignment target is supported with the longitudinal axis thereof parallel to the vertical plane with the line-of-sight therewithin. In the arrangement disclosed and with the unit permanently installed, the demountable target assembly is mountable during the use of the optical line-of-sight, demountable therefrom, and remountable on the optical line-of-sight without further adjustment.

19 Claims, 8 Drawing Figures

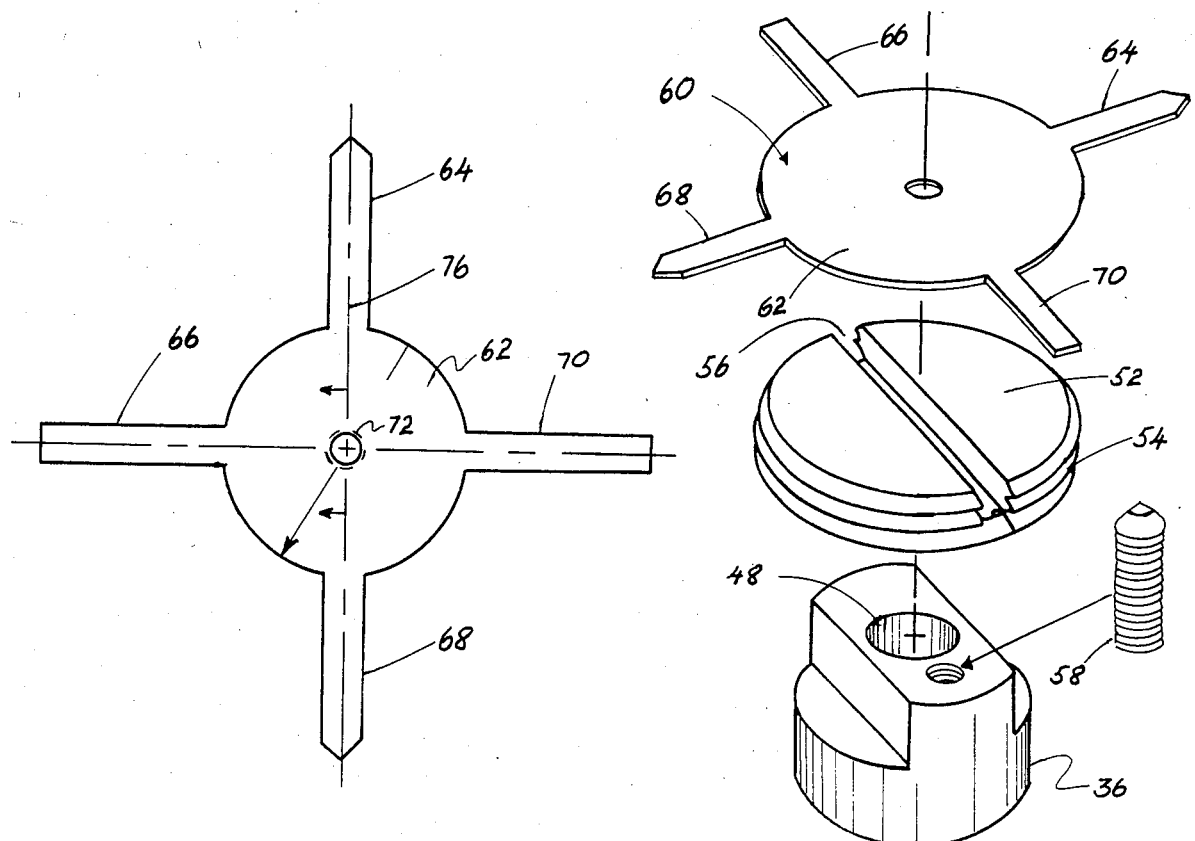
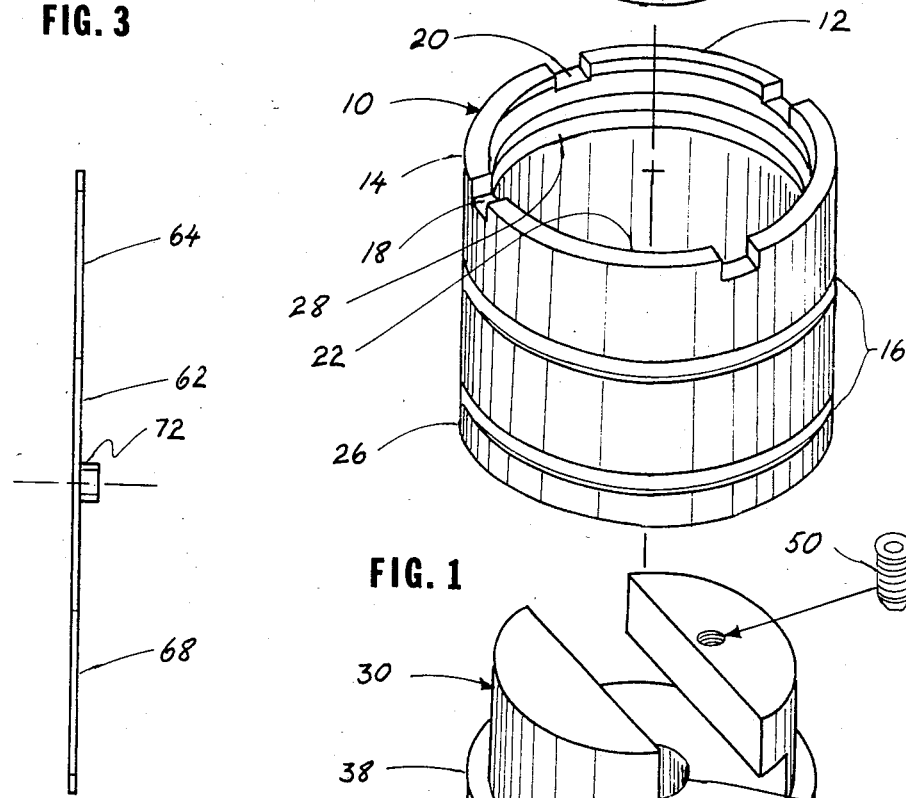
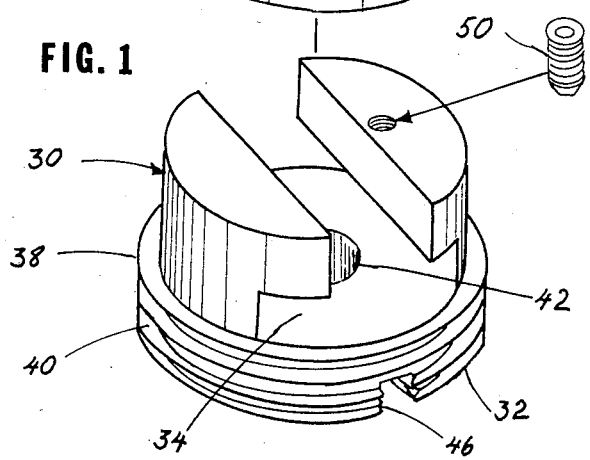
FIG. 3
FIG. 4
FIG. 1

DEVICE FOR ALIGNMENT OF PROCESS EQUIPMENT AND METHOD OF USE THEREOF

BACKGROUND OF THE INVENTION

1. Field of the Invention

This invention relates to optical tooling devices, and more particularly to establishing highly accurate alignment by apparatus providing large precise measurements and method of application thereof. The invention provides a method of making measurements which are inherently extremely accurate for application to many large scale manufacturing processes.

2. Disclosure Information Statement

The history of the optical tooling industry is quite recent and by and large has been treated as an offshoot of surveying instrumentation; however, the industry has quickly developed capabilities beyond the scope of the surveying instrumentation. The primary reference work in the field is *Optical Tooling for Precise Manufacture and Alignment* by Philip Kissam (New York, 1962; McGraw-Hill Book Co.). It is believed that the industry arose in response to aircraft construction needs during World War II. Mass production techniques were consequently developed to provide uniform airframe construction, and, during the latter part of the War, these included the application of the alignment telescope and the fixed line-of-sight principle thereof.

The use of optical tooling has spread considerably since the 1940's and is now widely used in the processing industries, especially for the precise alignment of rollers in the pulp and paper industry, the plastics industry and metalworking. The alignment of rollers in the paper industry is frequently complicated by thermal considerations and by the slightly crowned configuration of the rollers.

In the past, the major providers of optical tooling have been the Kenffel & Esser Co. and the Brunson Instrument Co. Since their activity in the above-described field has been closely observed no separate and specific pre-examination patentability search has been conducted.

SUMMARY OF THE INVENTION

The invention discloses accessory devices for optical tooling, which devices are for permanent installation adjacent to manufacturing process equipment and for the demarcation of one or more lines-of-sight relative to the optical tooling application. Typically, as the method hereof describes, two alignment-target mounts are permanently installed in the floor of the factory and intermediate alignment-target mounts are likewise installed. The methods of establishing the reference line-of-sight and of setting intermediate points are provided.

The invention further discloses an alignment-target mount for permanent installation along an optical line-of-sight. The mount includes a cylindrical body of a nonferrous material, which body, in turn, includes a hollow casing with a longitudinal axis substantially positionable within the vertical plane of the line-of-sight; a plug attachable to the inner casing wall having a rotatably positionable slideway thereacross; an alignment-target base slidably supported by the slideway of the plug and adjustable along a line predetermined by the rotational position of the plug; and a locking device for affixing the target base to the plug. With the basic unit, there is included a demountable target assembly affixable to the alignment-target base. The geometry of the target base is such that the alignment target is supported with the longitudinal axis thereof parallel to the vertical plane with the line-of-sight therewithin. In the arrangement disclosed and with the unit permanently installed, the demountable target assembly is mountable during the use of the optical line-of-sight, demountable therefrom, and remountable on the optical line-of-sight without further adjustment.

OBJECTS OF THE INVENTION

It is an object of the present invention to provide for optical tooling purposes, permanently installed alignment-target mounts along a reference line-of-sight.

It is a further object of the present invention to provide alignment-target mounts that have longitudinal axes that are vertical and are adjustable.

It is a yet further object of the present invention to improve operational accuracy in order of magnitude over the present method or after setting up reference lines to obtain accuracy within 0.003 inch.

Other objects and features of the invention will become apparent as the drawings which follow are understood by reading the corresponding description thereof.

BRIEF DESCRIPTION OF THE DRAWINGS

In the drawings which follow, the same parts shown on more than one of the various views are provided the same reference numbers.

FIG. 1 is an exploded view of the improved alignment target mount of this invention for permanent installation on the optical line-of-sight;

FIG. 3 is a top plan view of the locating plate of FIGS. 1 and 2;

FIG. 4 is a sectional view of the locating plate of FIG. 3;

DESCRIPTION OF THE PREFERRED EMBODIMENTS

In optical tooling, there are two basic approaches, namely, (1) the use of free-standing equipment which needs to be "bucked" in to the line-of-sight upon each application, and (2) the use of dedicated equipment mounted on tooling bars which needs to be referenced to the master line-of-sight upon each application. In both, the need for a well-defined master line-of-sight and the width plane generated therefrom are crucial elements to accurate optical tooling. To establish the line-of-sight and the width plane, the tooling accessories disclosed herein are described in relation to a floor mounted installation, such as a paper mill, and the alignment task in relation to a paper mill roll alignment. While the installation and the task are described in this manner, it is within the state-of-the-art to vary the application of the components hereof without departing from the spirit of the invention.

Figure 2:
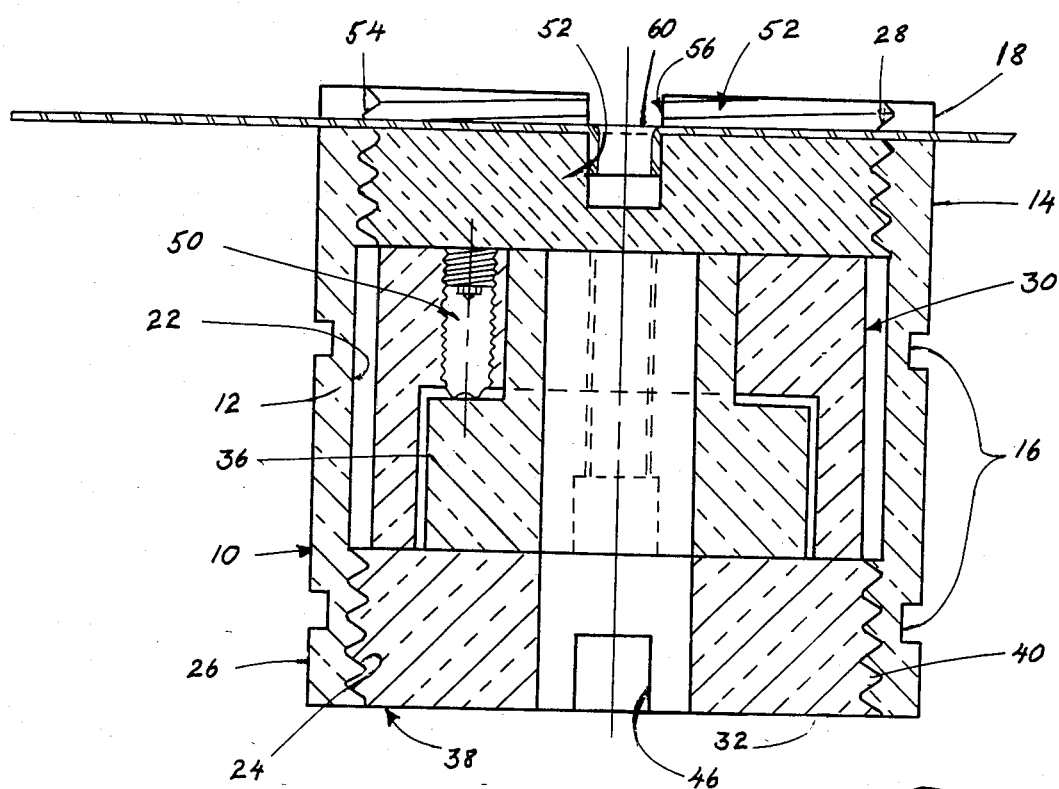
FIG. 2 is a cross-sectional view of the alignment target mount of FIG. 1.

Referring now to FIGS. 1 and 2, an exploded view and a cross sectional view of an improved alignment target mount of this invention is shown, and the target mount is referred to generally by the numeral 10. The target mount or plug 10 has a housing or hollow casing 12 which is shown as a substantially cylindrical body and is generally constructed of brass or other similarly rigid, corrosion-resistant nonferrous material. In the exterior face 14 of casing 12, one or more retainer grooves 16 are provided to minimize the loss of alignment after installation. The upper edge 18 of the casing 12 has locating plate slots 20 to accommodate the arms of the locating plate described in detail hereinbelow. These slots are shown at 90-degree intervals about the upper edge 18. In the inner surface 22 of the casing 12, a lower threaded portion 24 adjacent lower edge 26 and an upper threaded portion 28 adjacent upper edge 18 are constructed to mate with the lower cover and upper cover portions, respectively, of the alignment target mount. Into the base or lower portion of the mount, a bushing mount 30 is threadedly insertable. The bushing mount 30 is, in the embodiment disclosed hereby, constructed integrally with the lower cover portion 32 which, in turn, forms the lowermost part of the bushing mount. The bushing mount 30 is rotatably positionable and has through the upper central portion thereof an inverted T-slot or slideway 34 for receiving target bushing 36 and about the lower perimeter 38 of lower cover portion 32, a threaded portion 40 for threadingly mating with lower threaded portion 24. A mounting hole 42 is provided centered within the lower cover portion 32 for supporting alignment target mast 44, FIG. 5. For threading lower cover portion 32, FIGS. 1 and 2, into casing 12, a screwdriver slot 46 is included on the lower exterior face of bushing mount 30. A target bushing 36 having an inverted-T cross section for adjustably mating with T-slot 34 is constructed for linear adjustment to carry the alignment target on a line normal to the width plane. The target bushing 36 is constructed to include a mounting hole 48 for supporting alignment target mast 44. The mounting hole 48 is positioned so that upon setting the first location, this hole aligns with mounting hole 42. The bushing mount 30 and the target bushing 36 are then securable the one to the other with a bushing mount setscrew 50, which is provided in the upper portion of the bushing mount 30. An upper cover 52 includes a threaded portion 54 and a screwdriver slot 56 for threadingly attaching the cover 52 to the upper threaded portion 28 of casing 12. For further adjustment, a target bushing setscrew 58 is constructed to provide indexing for alignment target to be mounted thereabove.

Referring now to FIGS. 1 through 4, locating plate 60 is shown. The locating plate is dimensioned so that the central body portion 62 thereof fits snugly within upper threaded portion 28 when arms 64, 66, 68 and 70 are aligned in slots 20. In the center of body 62, a dimple 72 (seen most clearly in FIGS. 2 and 4) is impressed so that the locating plate 60 is securely held to cover 52 by press fitting into slot 56.

Figure 5:
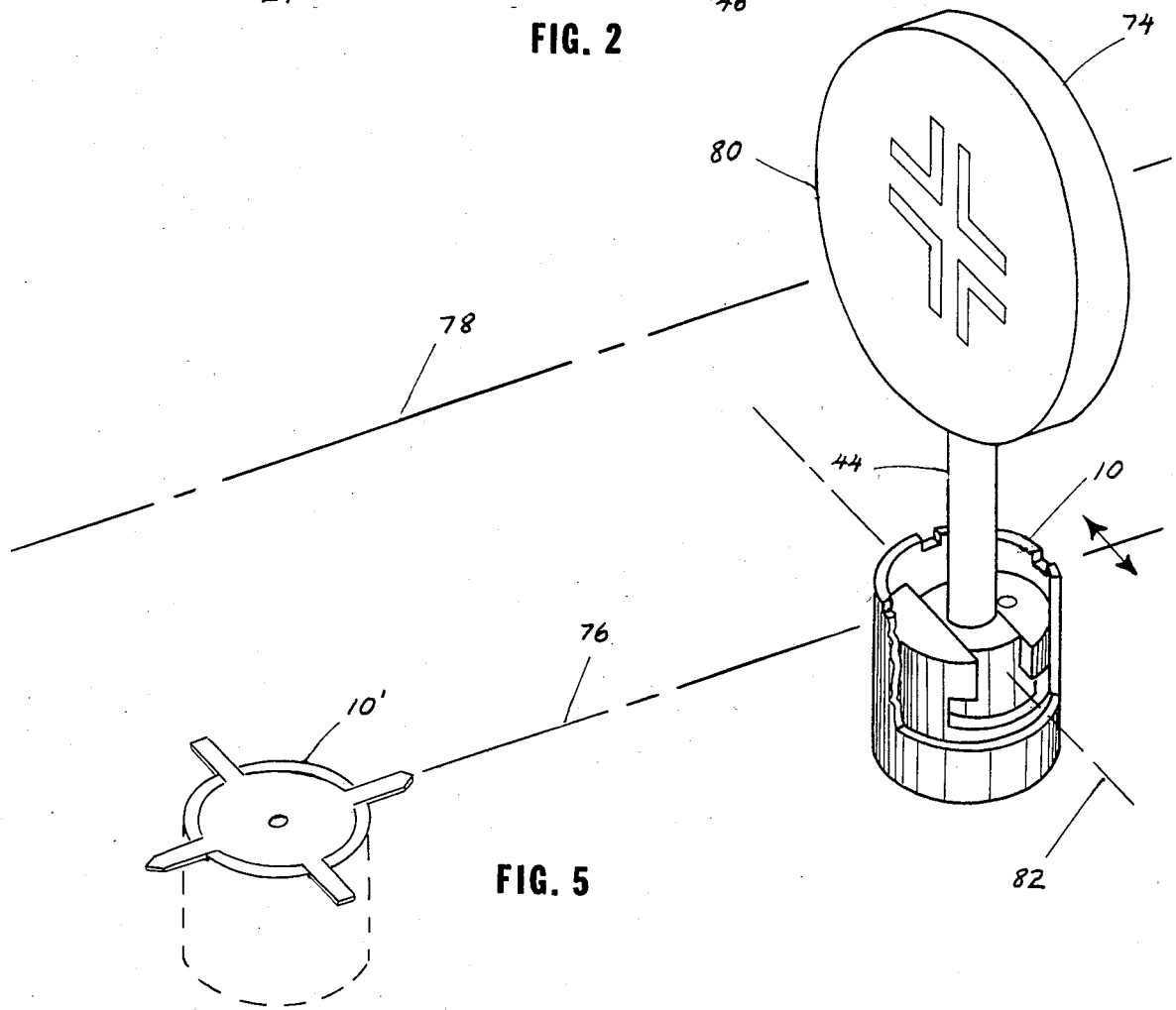
FIG. 5 is a diagram of the installation of a pair of alignment target mounts with an alignment target erected on one of the alignment target mounts of the installation, which mount is shown cutaway for details, and further the diagram shows the relation to the optical line-of-sight.

Referring now to FIG. 5 a pair of target mounts 10 and 10' are shown and further an alignment target mast 44 is shown mounted in a target bushing 36 with an alignment target 74 thereon. The arms 64 and 68 of locating plate 60 are structured to provide the floor centerline 76 and the vertical plane therethrough the width plane which, in turn, includes the optical line-of-sight 78 that passes through the target point of alignment target 80. The target mount 10 as shown is provided with a bushing mount 30 movable along adjustment line 82, which line is normal to the width plane.

Figure 6:
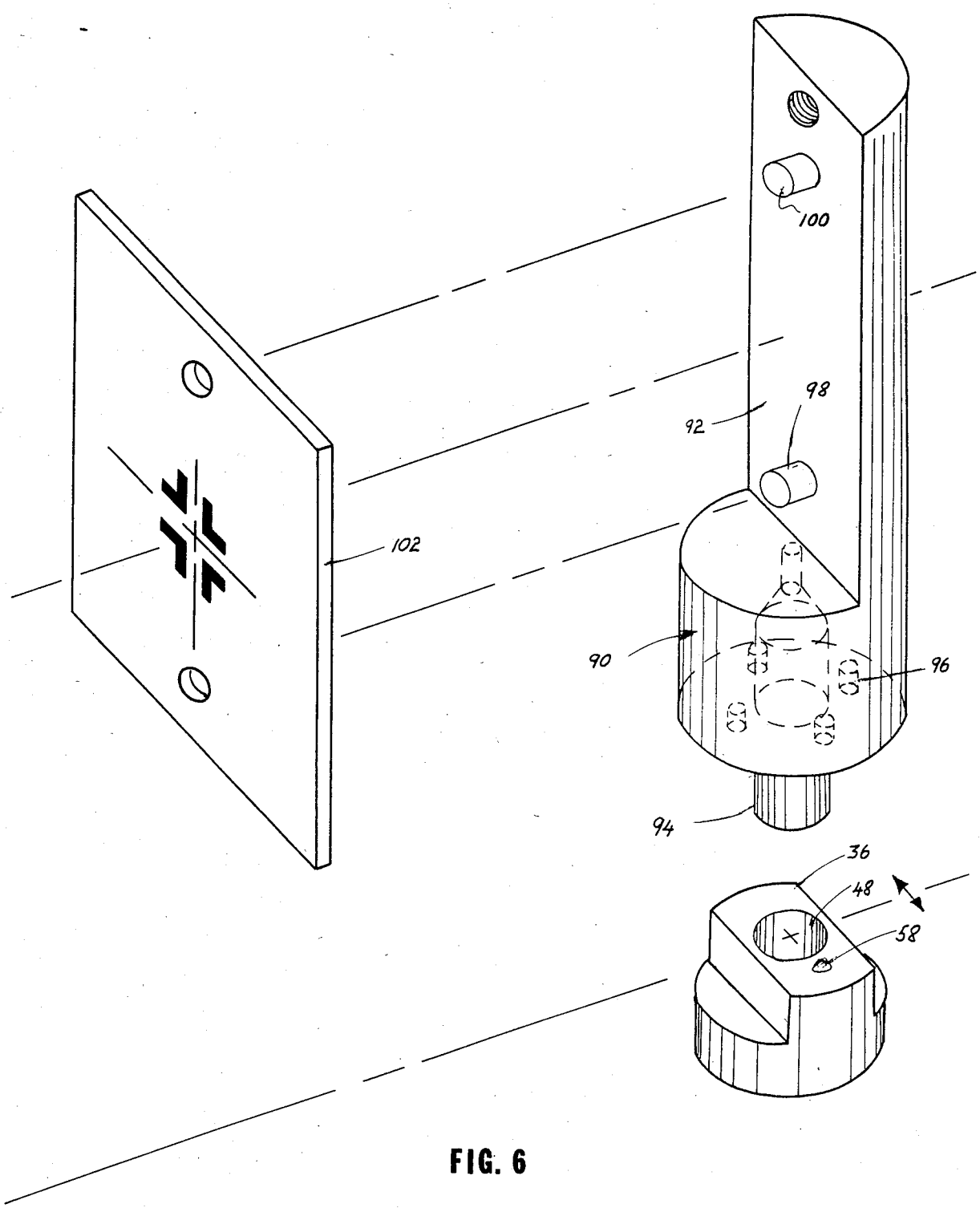
FIG. 6 is a diagram showing the relationship among a square alignment target, a target mount assembly therefor, and the target mount bushing of FIGS. 1 and 2, said diagram further showing schematically the detent arrangement of the target mount assembly.

Referring now to FIG. 6 a target holder assembly is shown, and is referred to generally by the number 90. This assembly is not described as another embodiment, but rather as another accessory provided in an assortment of the same that are part of this invention. Here, although the assembly shown includes a square target, it is understood that similar structures may be devised for targets such as the circular target of FIG. 5. The target holder assembly is structured to include target mount body 92, FIG. 6, which, in turn, includes a mounting dowel pin 94 (a foreshortened version of target mast 44) for mounting the assembly onto target bushing 36. The dowel pin is closely fitted to mounting hole 48 so as to maintain the target alignment with great precision. Corresponding to the target bushing setscrew 58, index holes 96 are constructed to provide a detented arrangement for swinging the alignment target 90, 180, or 270 degrees. Thus, optical sightings are accommodated that include both those normal to the width plane and those in the width plane, but 180 degrees displaced from the optical sighting previously described. The target holder assembly is constructed with a doweled arrangement providing target mounting dowel pins 98 and 100 that accommodate the alignment target mount 102 (Algate Instrument Model No. 910 or equivalent).

Figure 8:
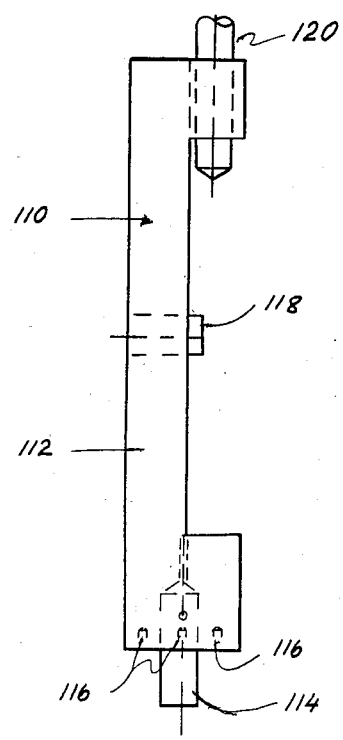
Figure 7:
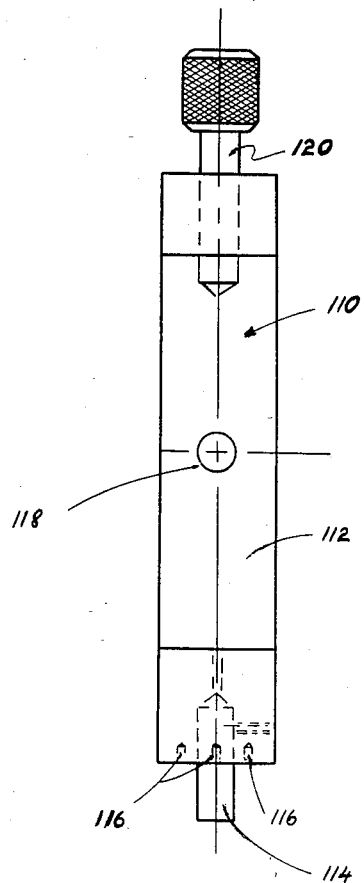
FIG. 7 is a front view of another target mount assembly for a circular alignment target; and, FIG. 8 is a side elevational view of the target mount of FIG. 7.

Referring now to FIGS. 7 and 8 a target holder assembly is shown, and is referred to generally by the number 110. This assembly is also not described as another embodiment, but rather as another accessory provided in an assortment of the same that are part of this invention. The target mount assembly is structured to include target mount body 112, which, in turn, includes a mounting dowel pin 114 (a foreshortened version of target mast 44) for mounting the assembly onto target bushing 36. The dowel pin is closely fit to mounting hole 48 so as to maintain the target alignment with great precision. Corresponding to the target bushing set screw 58, index holes 116 are constructed to provide a dented arrangement for swinging the alignment target 90, 180, or 270 degrees. Thus, optical sightings are accommodated that include both those normal to the width plane and those in the width plane, but 180 degrees displaced from the optical sighting previously described. The target mount assembly is constructed with a pinned arrangement which, in turn provides a target mounting dowel pin 118 and a gravity-held locator pin 120 that accommodate the alignment target.

In operation, the first and second target mounts are typically securely placed along a chalked floor centerline. A jig transit telescope (not shown) is "bucked in" on the line and sighted on the alignment targets erected thereon. The jig transit telescope then defines the width plane for optical tooling purposes. Additional intermediate target mounts are placed along the chalked floor centerline so that locating plane arm 64 and 68 are visually aligned. The jig transit telescope is then used to define the positioning of the intermediate target mounts. In these target mounts, the set screw 50 is loosened. A target mast 44 and alignment target 74 is erected on positioning mount 30. The jig transit telescope is then used to finally adjust the positioning of the alignment target by sliding target position 46 along slideway 34 of the positioning mount 30. Upon adjustment set screw 50 is tightened so that bushing mount and target bushing 46 are secured to one to the other. This arrangement defines the optical line of sight through the alignment target 74 and within the width plane previously discussed. Further optical tooling sightings can be taken from this basic arrangement which are normal to the width plane. Such lines in an application such as a paper mill roll alignment are generaly parallel to the rollers being aligned. As required additional target mountings may be arrayed about the installation to facilitate referencing the optical tooling equipment to a well-defined, prescribed alignment.

Although the best mode of the invention has been described herein in some detail, it has not been possible to include each and every variation. Those skilled in the art of optical tooling equipment and accessories will be able to make slight variations in the mechanical arrangement suggested hereby without departing from the spirit of the invention and still be within the scope of the claims appended hereto.

What is claimed is:

1. An improved alignment target mount for permanent installation along an optical line-of-sight comprising:
   (a) a cylindrical body comprising, in turn;
      (1) a hollow casing with a longitudinal axis substantially positionable within the vertical plane including said line-of-sight;
      (2) plug means rotatably attached to the inner casing wall with a rotatably positionable slideway thereacross;
      (3) an alignment target base slidably supported by the slideway of said plug means and adjustable along a line predetermined by the rotational position of said plug means, said target base including means for supporting an alignment target having a longitudinal axis with said axis parallel to said vertical plane; and
      (4) locking means for affixing said target base to said plug means; and,
   (b) a demountable alignment target assembly affixable to said alignment target base;
   whereby, in a permanently installed unit, said demountable target assembly is mountable during the use of said optical line-of-sight, demountable therefrom, and remountable on said optical line-of-sight without further adjustment.

2. An improved alignment target mount, as described in claim 1, wherein said plug is rotatably positioned with the slideway substantially normal said vertical plane.

3. An improved alignment target mount as described in claim 2 wherein said cylindrical body further comprises a cover attachable to the upper end of said hollow casing.

4. An improved alignment target mount as described in claim 1 wherein said demountable target assembly further comprises:
   (a) target holder means for insertion into said target base; and,
   (b) an alignment target affixable to said target holder means.

5. An improved alignment target mount as described in claim 4 wherein said target holder means further includes a detented carriage means for rotating said alignment target, said detented carriage means with stops at 0, 90, 180 and 270 degrees.

6. An improved alignment target mount as described in claim 1 wherein said hollow casing further includes at least one groove means in the outer casing wall for securing said cylindrical body during permanent installation thereof.

7. An improved alignment target mount as described in claim 1 wherein said casing further includes four vertical slots in the upper end of said casing spaced 90 degrees the one from the adjacent one thereof, said vertical slots for preliminary alignment purposes.

8. An improved alignment target mount as described in claim 7 wherein said cylindrical body further comprises a locating plate with arms spaced at 90 degree intervals and extending through said vertical slots for preliminary alignment purposes.

9. An improved optical line-of-sight device for permanent installation adjacent an optical tooling controlled installation comprising:
   (a) a first cylindrical body for permanent installation at one point on an optical-line-of-sight comprising, in turn;
      (1) a first hollow casing with a longitudinal axis substantially positionable within the vertical plane including said line-of-sight;
      (2) first plug means rotatably attached to the inner casing wall, said plug means having a rotatably positionable slideway;
      (3) a first alignment target base slidably supported by the slideway of said first plug means and adjustable along a line predetermined by the rotational position of said plug means, said first target base including means for supporting an alignment target having a longitudinal axis with said axis parallel to said vertical plane; and
      (4) first locking means for affixing said first target base to said first plug means;
   (b) a demountable first target assembly comprising, in turn:
      (1) first target holder means for insertion into said target base; and,
      (2) a first alignment target affixable to said target holder means;
   (c) a second cylindrical body for permanent installation at another point on an optical-line-of-sight comprising, in turn:
      (1) a second hollow casing with a longitudinal axis substantially positionable within the vertical plane including said line-of-sight;
      (2) second plug means for attachment to the inner casing wall, said plug means having a rotatably positionable slideway;
      (3) a second alignment target base slidably supported by the slideway of said second plug means and adjustable along a line predetermined by the rotational position of said plug means, said second target base including means for supporting an alignment target having a longitudinal axis with said axis parallel to said vertical plane; and
      (4) second locking means for affixing said second target base to said second plug means;
   (d) a demountable second target assembly comprising, in turn:
      (1) second target holder means for insertion into said target base; and,
      (2) a second alignment target affixable to said target holder means;

whereby, with a pair of permanently installed units, defining an optical line-of-sight, said target holder means and alignment targets are mountable during use of said optical line-of-sight, demountable therefrom, and remountable on said optical line-of-sight without further adjustment.

10. An improved alignment target mount as described in claim 9 wherein said first target holder means further includes a first detented carriage means for rotating said alignment target, said first detented carriage means with stops at 0, 90, 180 and 270 degrees.

11. An improved alignment target mount as described in claim 9 wherein said first hollow casing further includes at least one first groove means in the outer casing wall for securing said first cylindrical body during permanent installation thereof.

12. An improved alignment target mount as described in claim 9 wherein said first cylindrical body further comprises a cover attachable to the upper end of said first hollow casing.

13. An improved alignment target mount as described in claim 9 wherein said first casing further includes first four vertical slots in the upper end of said first casing spaced 90 degrees the one from the adjacent one thereof, said first slots for preliminary alignment purposes.

14. An improved alignment target mount as described in claim 13 wherein said first cylindrical body further comprises a locating plate with arms spaced at 90-degree intervals and extending through said first vertical slots for preliminary alignment purposes.

15. An improved alignment target mount as described in claim 9 wherein said second target holder means further includes a second detented carriage means for rotating said alignment target, said second detented carriage means with stops at 0, 90, 180 and 270 degrees.

16. An improved alignment target mount as described in claim 9 wherein said second hollow casing further includes at least one second groove means in the outer casing wall for securing said second cylindrical body during permanent installation thereof.

17. An improved alignment target mount as described in claim 9 wherein said second cylindrical body further comprises a second cover attachable to the upper end of said second hollow casing.

18. An improved alignment target mount as described in claim 9 wherein said second casing further includes four vertical second slots in the upper end of said second casing spaced 90 degrees the one from the adjacent one thereof, said second slots for preliminary alignment purposes.

19. An improved alignment target mount as described in claim 18 wherein said second cylindrical body further comprises a second locating plate with arms spaced at 90-degree intervals and extending through said second vertical slots for preliminary alignment purposes.

* * * * *